United States Patent
Moyer et al.

(10) Patent No.: US 12,204,454 B2
(45) Date of Patent: Jan. 21, 2025

(54) SYSTEM PROBE AWARE LAST LEVEL CACHE INSERTION BYPASSING

(71) Applicant: Advanced Micro Devices, Inc., Santa Clara, CA (US)

(72) Inventors: Paul James Moyer, Fort Collins, CO (US); Jay Fleischman, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/514,417

(22) Filed: Oct. 29, 2021

(65) Prior Publication Data
US 2022/0050785 A1   Feb. 17, 2022

Related U.S. Application Data

(63) Continuation of application No. 16/580,139, filed on Sep. 24, 2019, now Pat. No. 11,163,688.

(51) Int. Cl.
*G06F 12/0888* (2016.01)
*G06F 12/0811* (2016.01)
*G06F 12/0846* (2016.01)

(52) U.S. Cl.
CPC ...... *G06F 12/0888* (2013.01); *G06F 12/0811* (2013.01); *G06F 12/0848* (2013.01); *G06F 2212/1016* (2013.01); *G06F 2212/601* (2013.01)

(58) Field of Classification Search
CPC ............. G06F 12/0888; G06F 12/0811; G06F 12/0848; G06F 2212/1016; G06F 2212/601
See application file for complete search history.

(56) References Cited

U.S. PATENT DOCUMENTS

| 5,303,362 A | 4/1994 | Butts et al. |
| 5,864,671 A | 1/1999 | Hagersten et al. |

(Continued)

FOREIGN PATENT DOCUMENTS

| JP | 2008515095 | 5/2008 |
| JP | 2009122787 | 6/2009 |

(Continued)

OTHER PUBLICATIONS

International Search Report and Written Opinion in International Application No. PCT/US2020/052503, mailed Dec. 3, 2020, 14 pages.

*Primary Examiner* — Charles J Choi
(74) *Attorney, Agent, or Firm* — Kowert, Hood, Munyon, Rankin & Goetzel, P.C.; Rory D. Rankin

(57) ABSTRACT

Systems, apparatuses, and methods for employing system probe filter aware last level cache insertion bypassing policies are disclosed. A system includes a plurality of processing nodes, a probe filter, and a shared cache. The probe filter monitors a rate of recall probes that are generated, and if the rate is greater than a first threshold, then the system initiates a cache partitioning and monitoring phase for the shared cache. Accordingly, the cache is partitioned into two portions. If the hit rate of a first portion is greater than a second threshold, then a second portion will have a non-bypass insertion policy since the cache is relatively useful in this scenario. However, if the hit rate of the first portion is less than or equal to the second threshold, then the second portion will have a bypass insertion policy since the cache is less useful in this case.

20 Claims, 6 Drawing Sheets

(56) References Cited

U.S. PATENT DOCUMENTS

| | | | |
|---|---|---|---|
| 5,873,117 A | 2/1999 | Hagersten et al. | |
| 6,202,126 B1 | 3/2001 | Van Doren et al. | |
| 6,275,905 B1 | 8/2001 | Keller et al. | |
| 6,393,529 B1 | 5/2002 | Keller | |
| 6,397,302 B1 | 5/2002 | Razdan et al. | |
| 6,430,639 B1 | 8/2002 | Meyer et al. | |
| 6,446,189 B1 | 9/2002 | Zuraski, Jr. et al. | |
| 6,490,661 B1 | 12/2002 | Keller et al. | |
| 6,598,123 B1 * | 7/2003 | Anderson | G06F 12/0833 |
| | | | 711/146 |
| 6,633,960 B1 | 10/2003 | Kessler et al. | |
| 6,973,543 B1 | 12/2005 | Hughes | |
| 7,694,075 B1 | 4/2010 | Feekes, Jr. | |
| 11,163,688 B2 | 11/2021 | Moyer et al. | |
| 2003/0065886 A1 * | 4/2003 | Olarig | G06F 12/12 |
| | | | 711/121 |
| 2006/0075192 A1 * | 4/2006 | Golden | G06F 12/126 |
| | | | 711/170 |
| 2009/0144388 A1 | 6/2009 | Gross et al. | |
| 2009/0327616 A1 * | 12/2009 | Conway | G06F 12/082 |
| | | | 711/146 |
| 2013/0091330 A1 | 4/2013 | Mital et al. | |
| 2013/0151777 A1 * | 6/2013 | Daly | G06F 12/0897 |
| | | | 711/E12.024 |
| 2013/0346694 A1 | 12/2013 | Krick et al. | |
| 2016/0275017 A1 * | 9/2016 | Takeda | G06F 12/0893 |
| 2016/0350220 A1 | 12/2016 | Salisbury et al. | |
| 2017/0149924 A1 * | 5/2017 | Peterson | H04L 67/5682 |
| 2017/0300427 A1 * | 10/2017 | Lin | G06F 12/128 |
| 2017/0357597 A1 | 12/2017 | Tune | |
| 2018/0060238 A1 * | 3/2018 | Esser | G06F 12/0848 |
| 2018/0349292 A1 | 12/2018 | Tal et al. | |
| 2019/0034354 A1 | 1/2019 | Priyadarshi | |

FOREIGN PATENT DOCUMENTS

| | | |
|---|---|---|
| KR | 20160086764 A | 7/2016 |
| WO | 2015111135 | 7/2015 |

* cited by examiner

SYSTEM PROBE AWARE LAST LEVEL CACHE INSERTION BYPASSING

CROSS REFERENCE TO RELATED APPLICATIONS

This application is a continuation of U.S. patent application Ser. No. 16/580,139, now U.S. Pat. No. 11,163,688, entitled "SYSTEM PROBE AWARE LAST LEVEL CACHE INSERTION BYPASSING", filed Sep. 24, 2019, the entirety of which is incorporated herein by reference.

BACKGROUND

Description of the Related Art

Computer systems use main memory that is typically formed with inexpensive and high density dynamic random access memory (DRAM) chips. However DRAM chips suffer from relatively long access times. To improve performance, data processors typically include at least one local, high-speed memory known as a cache. In a multi-core data processor, each data processor core can have its own dedicated level one (L1) cache, while other caches (e.g., level two (L2), level three (L3)) are shared by data processor cores.

Cache subsystems in a computing system include high-speed cache memories that store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block is varied according to design choice, and can be of any size. In addition, each of the terms "cache tag", "cache line tag", and "cache block tag" is interchangeable.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Probe filters are a key building block in high performance scalable systems. A probe filter is used to keep track of the cache lines that are currently in use by the system. A probe filter improves both memory bandwidth as well as reducing probe bandwidth by performing a memory request or probe request only when required. Logically, the probe filter resides at the home node of a cache line which enforces the cache coherence protocol. The operating principle of a probe filter is inclusivity (i.e., a line that is present in a central processing unit (CPU) cache must be present in the probe filter).

Probe filters are usually sized to cover all caches for expected traffic patterns, but probe filters can run into capacity issues with certain types of nonstandard traffic. For example, traffic that results in heavy index-conflicts at the probe filter can cause capacity issues. Also, traffic that results in sparse accesses in the case of the probe filter entries tracking multiple cache lines can cause capacity issues. With very large level three (L3) caches and last level caches (LLCs), system probe filters get stressed for capacity, resulting in recalls from the caches to make room in the probe filter for new cache lines. In the extreme, the LLC is rendered useless because lines are prematurely evicted, and performance can degrade even further if the system is not designed to support the maximum throughput recall flows.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for employing system probe filter aware last level cache insertion bypassing policies are disclosed herein. In one implementation, a system includes a plurality of nodes, a probe filter, and a last level cache (LLC). The probe filter monitors a rate of recall probes that are generated, and if the rate is greater than a first threshold, then the system initiates a cache partitioning and monitoring phase for the shared cache. Accordingly, the cache is partitioned into two portions. If the hit rate of a first portion is greater than a second threshold, then a second portion will have a non-bypass insertion policy since the cache is useful in this scenario. However, if the hit rate of the first portion is less than or equal to the second threshold, then the second portion will have a bypass insertion policy since the LLC is not useful in this case. This helps to reduce the number of recall probes that are generated when the LLC has a low hit rate.

Figure 1:
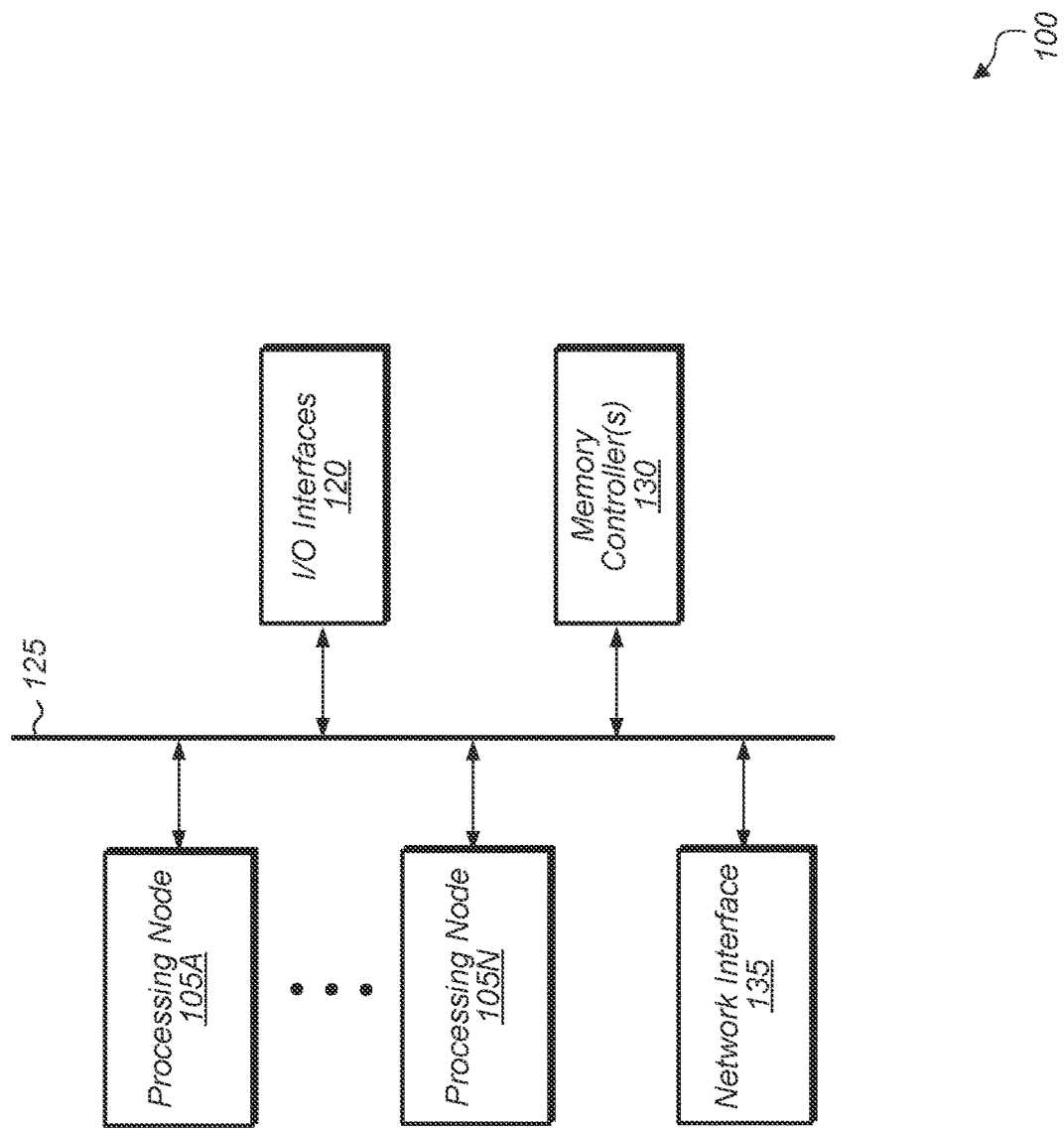
FIG. 1 is a block diagram of one implementation of a computing system.

Referring now to FIG. 1, a block diagram of one implementation of a computing system 100 is shown. In one implementation, computing system 100 includes at least processing nodes 105A-N, input/output (I/O) interfaces 120, bus 125, memory controller(s) 130, and network interface 135. In other implementations, computing system 100 can include other components and/or computing system 100 can be arranged differently. In one implementation, each processing node 105A-N includes one or more general purpose processors, such as central processing units (CPUs). It is noted that a "processing node" can also be referred to as a "core complex" or a "CPU" herein. In some implementations, one or more processing nodes 105A-N can include a data parallel processor with a highly parallel architecture. Examples of data parallel processors include graphics processing units (GPUs), digital signal processors (DSPs), and so forth. Each processor core within processing node 105A-N includes a cache subsystem with one or more levels of caches. In one implementation, each processing node 105A-N includes a cache (e.g., level three (L3) cache) which is shared between multiple processor cores.

Memory controller(s) 130 are representative of any number and type of memory controllers accessible by processing nodes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 can be a server, computer, laptop, mobile device, game console, streaming device, wearable device, or any of various other types of computing systems or devices. It is noted that the number of components of computing system 100 can vary from implementation to implementation. There can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
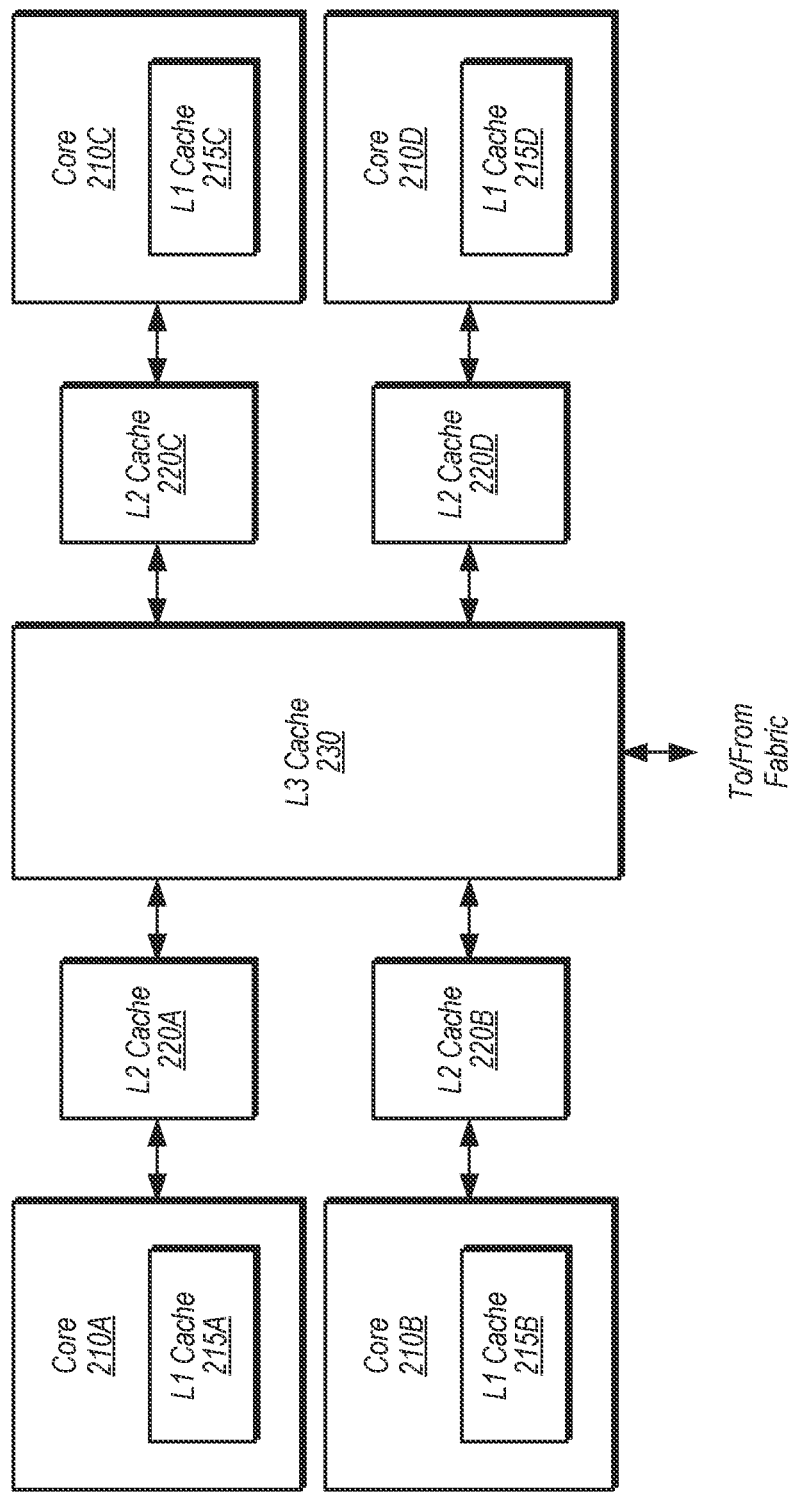
FIG. 2 is a block diagram of one implementation of a processing node.

Turning now to FIG. 2, a block diagram of one implementation of a processing node 200 is shown. In one implementation, processing node 200 includes four processor cores 210A-D. In other implementations, processing node 200 can include other numbers of processor cores. It is noted that a "processing node" can also be referred to as a "core complex" or "CPU" herein. In one implementation, the components of processing node 200 are included within processing nodes 105A-N (of FIG. 1).

Each processor core 210A-D includes a cache subsystem for storing data and instructions retrieved from the memory subsystem (not shown). For example, in one implementation, each core 210A-D includes a corresponding level one (L1) cache 215A-D. Each processor core 210A-D can include or be coupled to a corresponding level two (L2) cache 220A-D. Additionally, in one implementation, processing node 200 includes a level three (L3) cache 230 which is shared by the processor cores 210A-D. L3 cache 230 is coupled to a memory subsystem (not shown) via a fabric (not shown). It is noted that in other implementations, processing node 200 can include other types of cache subsystems with other numbers of cache and/or with other configurations of the different cache levels.

Figure 3:
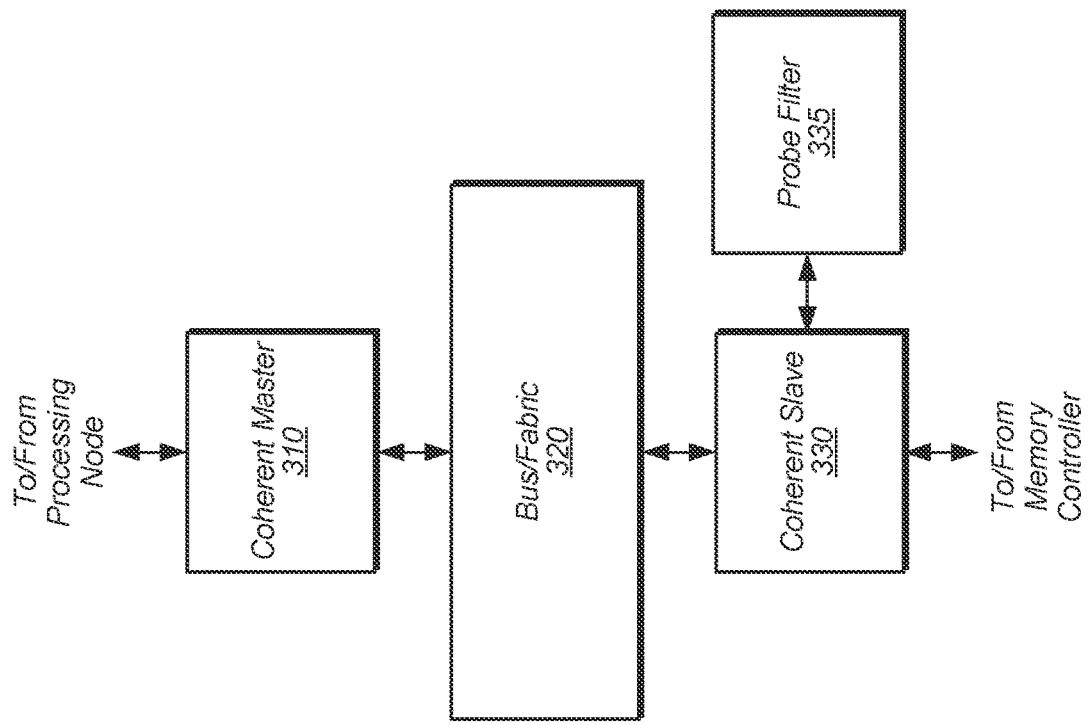
FIG. 3 is a block diagram of one implementation of a portion of a multi-node system.

Referring now to FIG. 3, a block diagram of one implementation of a portion of a multi-node system 300 is shown. In one implementation, system includes multiple processing nodes (not shown). The number of processing nodes per system can vary from implementation to implementation. In one implementation, each processing node is connected to a corresponding coherent master (e.g., coherent master 310). As used herein, a "coherent master" is defined as an agent that processes traffic flowing over an interconnect (e.g., bus/fabric 320) and manages coherency for a connected node. To manage coherency, a coherent master receives and processes coherency-related messages and probes and generates coherency-related requests and probes.

In one implementation, each processing node is coupled to a coherent slave (e.g., coherent slave 330) via a corresponding coherent master and bus/fabric 320. Coherent slave 330 is coupled to a memory controller (not shown) and coherent slave 330 is also coupled to probe filter 335, with probe filter 335 including entries for cache lines cached in system 300 for the memory accessible through the corresponding memory controller. As used herein, a "coherent slave" is defined as an agent that manages coherency by processing received requests and probes that target a corresponding memory controller. Additionally, as used herein, a "probe" is defined as a message passed from a coherency point to one or more caches in the computer system to determine if the caches have a copy of a block of data and optionally to indicate the state into which the cache should place the block of data. When coherent slave 330 receives a memory request targeting its corresponding memory controller, coherent slave 330 performs a lookup to probe filter 335. If the lookup to probe filter 335 is a hit, a probe is sent to the owner of the cache line targeted by the memory request. Otherwise, if the lookup to probe filter 335 is a miss, then the memory request is sent to memory without a probe being generated. Depending on the insertion policy of the probe filter 335, a new entry might be added to probe filter 335 when the lookup is a miss.

Figure 4:
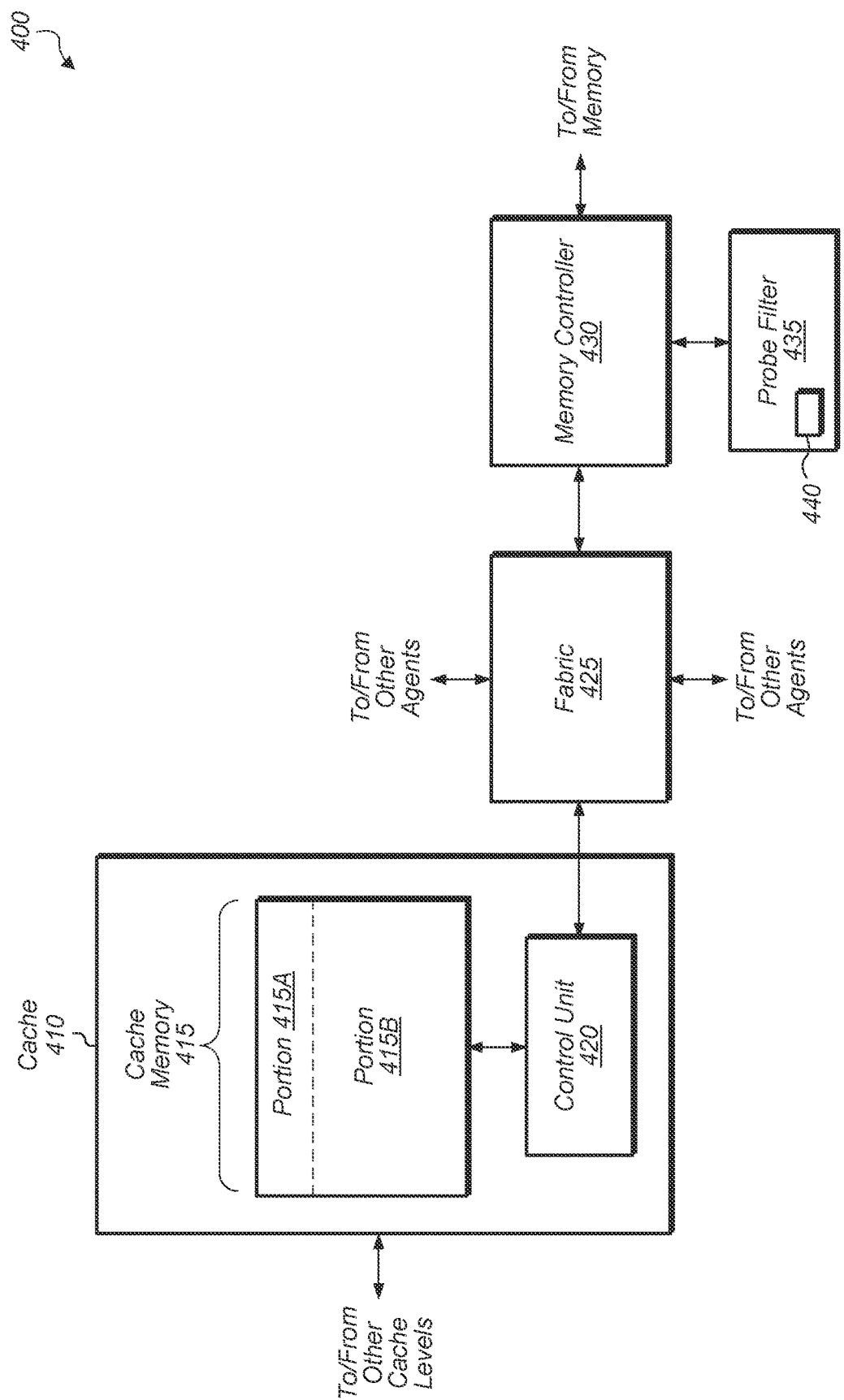
FIG. 4 is a block diagram of one implementation of a portion of a system on chip.

Turning now to FIG. 4, a block diagram of one implementation of a portion of a system on chip (SoC) 400 is shown. In one implementation, SoC 400 includes at least cache 410, fabric 425, memory controller 430, and probe filter 435. Cache 410 includes cache memory 415 and control unit 420, with cache 410 representative of any type of cache. For example, in one implementation, cache 410 is a level three (L3) cache, and cache 410 is coupled to a level two (L2) cache (not shown). In other implementations, cache 410 is other levels of cache in a cache hierarchy. It is noted that cache 410 can also be referred to herein as a last level cache (LLC).

Cache memory 415 includes any amount of memory capacity, with the amount of capacity varying according to the implementation. In one implementation, in response to detecting a high stress level for probe filter 435, cache memory 415 is partitioned into portion 415A and portion 415B, with portion 415A smaller than portion 415B. In one implementation, a "high stress level" is defined as probe filter 435 having a recall probe rate which is greater than a threshold. The recall probe rate refers to the number of recall probes that are generated over a given interval, with a recall probe being a message sent from probe filter 435 to cache 410 that causes cache 410 to evict a particular cache line. In other implementations, the "stress level" of probe filter 435 is determined by the recall probe rate and/or one or more other metrics. It should be understood that while the portions 410A-B appear to be contiguous portions of cache 410, this is shown merely for ease of illustration. In another implementation, portion 410A is a randomly selected number of indices into cache 410, with the indices spread throughout cache 410 in non-contiguous locations. In a further implementation, several partitions can be independently established for various classifications of cache traffic. For example, these classifications can be based on instruction lines, data lines, translation lookaside buffer (TLB) hardware table walker lines, software and hardware prefetchers of various types, traffic from various hardware threads or groups of threads, and so on. Control unit 420 then considers the hit-rate for a particular classification of cache line when making the decision on whether to apply a bypass or non-bypass insertion policy. Other ways of partitioning cache 410 into portions 410A-B are possible and are contemplated.

In one implementation, control unit 420 applies a non-bypass insertion policy for portion 415A while monitoring the hit rate for portion 415A. A non-bypass insertion policy means that at least a portion of the requests that miss in portion 415A will be allocated in portion 415A. Control unit 420 monitors the hit rate of portion 415A over a given interval of time, and if the hit rate is greater than a threshold, then control unit 420 applies the non-bypass insertion policy to portion 415B. If the hit rate for portion 415A is higher than the threshold, this indicates that cache 410 is useful, and cache lines should be inserted into the remaining portion 415B in this case. However, if the hit rate for portion 415A is less than or equal to the threshold, then this indicates that cache 410 is not particularly useful for the given application being executed by SoC 400. In this case, control unit 420 applies a bypass insertion policy for portion 415B to cause requests to go to memory instead of being allocated in portion 415B. The bypass insertion policy means that any request that misses on a lookup to portion 415B will not be allocated in portion 415B. The bypass insertion policy helps to reduce cache thrashing as well as reducing the number of recall probes that are generated by probe filter 435. As used herein, the term "recall probe" is defined as a message sent from a probe filter to a cache that causes the cache to evict a particular cache line from the cache. It is noted that the bypass insertion policy can be overridden by other mechanisms, such as detecting that a cache line may have further reuse via measuring the hit counts at higher levels of the cache or based on other determinations.

Fabric 425 is representative of any type of interconnect that connects the various components and/or agents of SoC 400 together. While fabric 425 is shown as a single unit, it should be understood that this is merely one way of representing fabric 425. In some implementations, fabric 425 includes multiple components that are spread throughout SoC 400, with these multiple components coupled together to allow requests, probes, probe recalls, and other messages to be sent between the various agents. Memory controller 430 is coupled to probe filter 435 and a memory (not shown). Requests received by memory controller 430 that target the corresponding memory will check probe filter 435 to see if the data is cached by cache 410.

In some cases, when a lookup to probe filter 435 results in a miss, probe filter 435 evicts an existing entry to make room for a new entry. To evict an existing entry, probe filter 435 generates a recall probe which is sent to cache 410. In a configuration where a given probe filter entry tracks a plurality of cache lines, a recall probe may be a plurality of probes. In response to receiving the recall probe, cache 410 evicts the corresponding cache line(s) since probe filter 435 is no longer able to track these particular cache line(s). When probe filter 435 is sending out frequent recall probes, this can have a negative effect on system performance.

Accordingly, to help prevent this scenario, in one implementation, probe filter 435 includes counter 440 to track how many recall probes are generated during a particular interval of time. If the number of recall probes generated during the interval is greater than a threshold, then probe filter 435 sends a message to control unit 420 of cache 410 to partition cache memory 415 into portion 415A-B and to start monitoring the hit rate for portion 415A. Otherwise, if the number of recall probes is less than or equal to the given threshold, then cache 410 can continue with its normal operations. Alternatively, in another implementation, control unit 420 monitors the number of recall probes that are received and compares the number to a threshold at a given interval.

Figure 5:
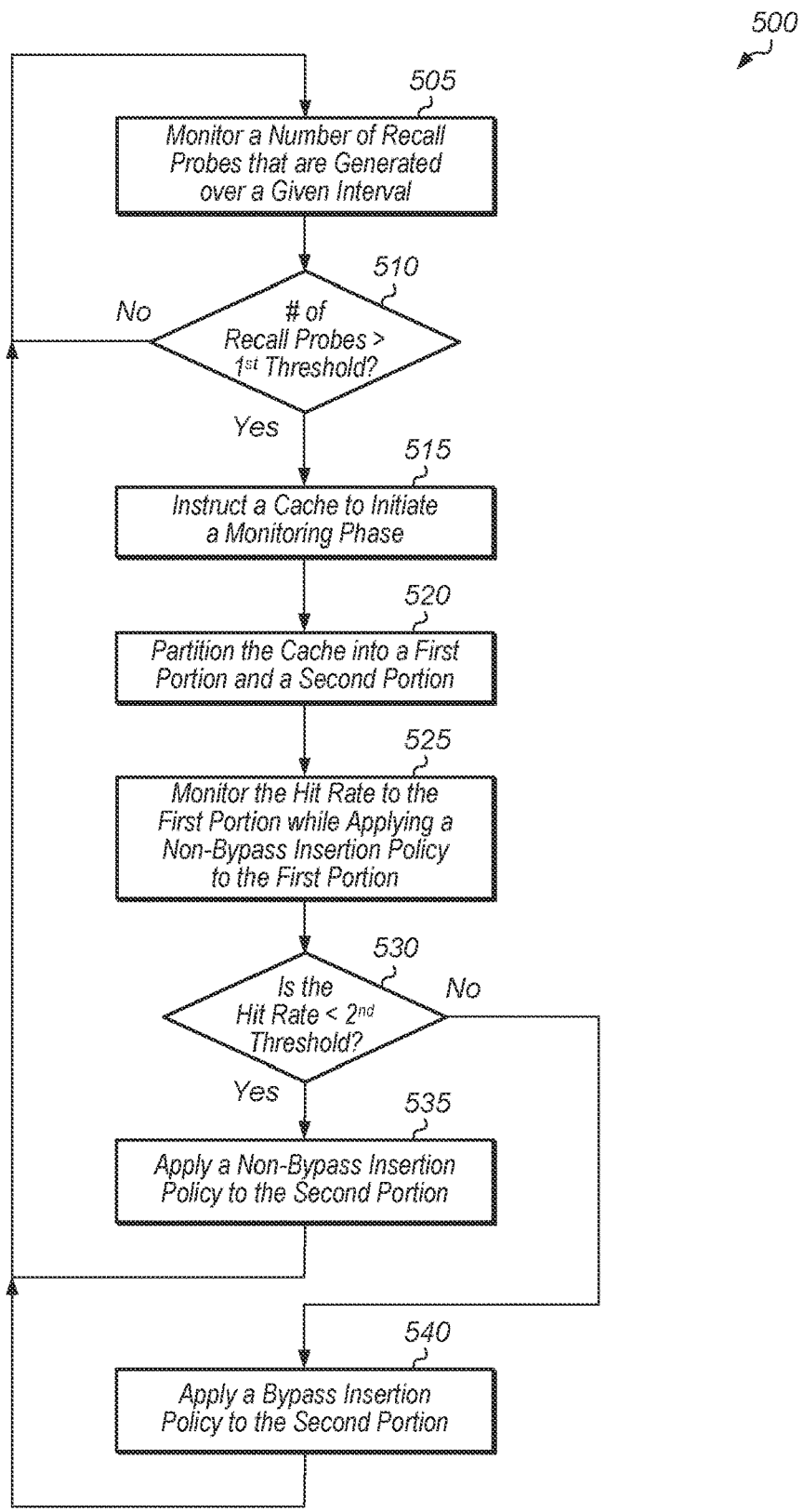
FIG. 5 is a generalized flow diagram illustrating one implementation of a method for employing a system probe aware last level cache insertion bypassing policy.
Figure 6:
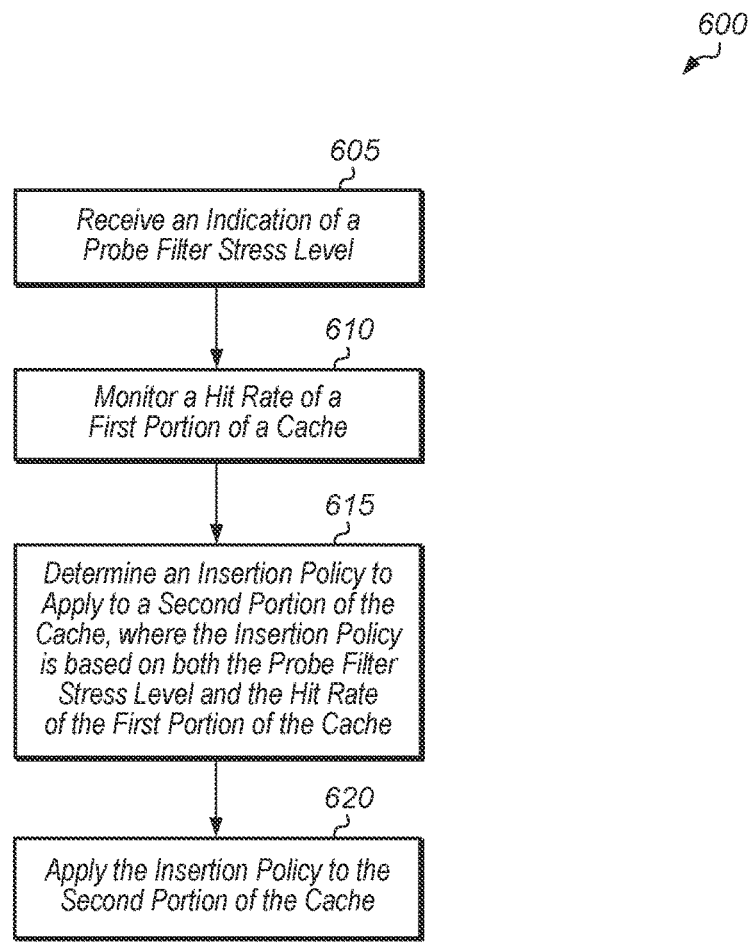
FIG. 6 is a generalized flow diagram illustrating one implementation of a method for determining an insertion policy for a portion of a cache.

Referring now to FIG. 5, one implementation of a method 500 for employing a system probe aware last level cache insertion bypassing policy is shown. For purposes of discussion, the steps in this implementation and those of FIG. 6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A probe filter monitors the number of recall probes that are generated over a given interval (block 505). Alternatively, in another implementation, a cache controller monitors the number of recall probes that are received over the given interval. Additional metrics other than just the number of probes can be monitored in block 505, such as counts of how many probes hit in various levels of caches (e.g., L1, L2, L3), what MOESI state the probes hit, and so on. If the number of recall probes that were generated is greater than a first threshold (conditional block 510, "yes" leg), then the probe filter instructs a cache (e.g., last level cache (LLC)) to initiate a monitoring phase (block 515). Otherwise, if the number of recall probes over the given interval is less than or equal to the first threshold (conditional block 510, "no" leg), then method 500 returns to block 505.

As part of initiating the monitoring phase, the cache is partitioned into a first portion and a second portion (block 520). In one implementation, the first portion includes some number of cache indices, with the second portion including the remainder of the cache. In one implementation, the cache indices of the first portion are randomly chosen. In other implementations, other suitable ways of partitioning the cache into the first and second portions can be used.

Next, after block 520, the cache monitors the hit rate to the first portion while applying a non-bypass insertion policy to the first portion (block 525). In one implementation, the non-bypass insertion policy results in cache lines being allocated for requests that miss in the second portion. In one implementation, the hit rate is calculated in terms of a number of cache hits divided by a total number of requests received by the cache. For example, if the cache receives 100 requests targeting the first portion and only 12 of these requests hit in the first portion, then the hit rate is 12%. If the hit rate for the first portion is less than a second threshold (conditional block 530, "yes" leg), then the cache applies a bypass insertion policy to the second portion (block 535). Applying the bypass insertion policy causes requests to not be allocated in the second portion, which helps to prevent cache thrashing and reduces stress on the probe filter. If the hit rate for the first portion is less than the second threshold, this indicates that the cache is not particularly useful for the current application. It is noted that in another implementation, the cache includes a plurality of monitors for monitoring the hit-rates for many different classifications of cache traffic. The cache then makes its bypass or non-bypass insertion policy decision based on the hit-rate for the particular classification of the targeted cache line. After block 535, method 500 returns to block 505. Alternatively, method 500 can alternate between returning to block 525 after block 535 on some iterations and returning to block 505 after block 535 on other iterations.

Otherwise, if the hit rate for the first portion is greater than or equal to the second threshold (conditional block 530, "yes" leg), then the cache applies a non-bypass insertion policy to the second portion (block 540). In this case, the cache is useful, and so the cache can allocate for requests that miss in the second portion. After block 540, method 500 returns to block 505. Alternatively, method 500 can alternate between returning to block 525 after block 540 on some iterations and returning to block 505 after block 540 on other iterations. It is noted that some amount of hysteresis can be applied to the thresholds of method 500 to prevent the cache from oscillating between non-bypass insertion policy and bypass insertion policy.

Turning now to FIG. 6, one implementation of determining an insertion policy for a portion of a cache is shown. A cache receives an indication of a probe filter stress level (block 605). In one implementation, the indication of the probe filter stress level is a measure of a recall probe rate of the probe filter. In other implementations, other metrics of the probe filter stress level are generated and used as indications which are sent to the cache. Also, the cache monitors a hit rate of a first portion of the cache (block 610).

Next, the cache determines an insertion policy to apply to a second portion of the cache, where the insertion policy is based on both the probe filter stress level and the hit rate of the first portion of the cache (block 615). Then, the insertion policy determined in block 615 is applied to the second portion of the cache (block 620). In one implementation, the cache determines an insertion rate which is based on a combination of the probe filter stress level and the hit rate of the first portion of the cache. For example, in one implementation, the higher the probe filter stress level and the lower the hit rate of the first portion, the higher the insertion rate that is applied to the cache when deciding whether to allocate new cache lines in the second portion of the cache. A higher insertion rate can also be referred to as a relatively less discriminating cache insertion policy. Conversely, the lower the probe filter stress level and the higher the hit rate of the first portion, the lower the insertion rate that is applied to the cache when deciding whether to allocate new cache lines in the second portion of the cache. A lower insertion rate can also be referred to as a relatively more discriminating cache insertion policy. After block 620, method 600 ends. It is noted that method 600 can be repeated at some interval to update the insertion policy based on changing levels of probe filter stress and changing hit rates for the first portion of the cache.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A cache comprising:
a control unit comprising circuitry configured to:
apply a non-bypass policy to a first portion of a cache memory, responsive to a hit rate of a second portion of the cache memory meeting a threshold, wherein the non-bypass policy permits at least a portion of requests that miss on the first portion to be allocated in the first portion; and
apply a bypass policy to the first portion, responsive to the hit rate of the second portion not meeting the threshold, wherein the bypass policy does not permit any request that misses on the first portion to be allocated in the first portion.

2. The cache as recited in claim 1, wherein the control unit is configured to monitor the hit rate of the second portion of the cache memory.

3. The cache as recited in claim 1, wherein the control unit is configured to apply either the non-bypass policy or the bypass policy, based at least in part on a number of recall probes exceeding a threshold.

4. The cache as recited in claim 3, wherein the control unit is configured to partition the cache memory based at least in part on evictions of data from the cache memory.

5. The cache as recited in claim 4, wherein the evictions of data are determined based in part on recall probes.

6. The cache as recited in claim 1, wherein the cache is shared by two or more processor cores.

7. The cache as recited in claim 1, wherein control unit is configured to create partitions of the cache memory based in part on a classification of cache traffic that comprises at least one of instructions lines, data lines, translation data, prefetch accesses, requests from particular requesters.

8. The cache as recited in claim 1, wherein the cache memory is shared by two or more processor cores.

9. A method comprising:
applying a non-bypass policy to a first portion of a cache memory, responsive to a hit rate of a second portion of the cache memory meeting a threshold, wherein the non-bypass policy permits at least a portion of requests that miss on the first portion to be allocated in the first portion; and applying a bypass policy to the first portion, responsive to the hit rate of the second portion of the cache memory not meeting the threshold, wherein the bypass policy does not permit any request that misses on the first portion to be allocated in the first portion.

10. The method as recited in claim 9, further comprising monitoring the hit rate of the second portion of the cache memory.

11. The method as recited in claim 10, further comprising applying either the non-bypass policy or the bypass policy, based at least in part on a number of recall probes exceeding a threshold.

12. The method as recited in claim 11, further comprising partitioning the cache memory based at least in part on detecting evictions of data from the cache memory.

13. The method as recited in claim 12, further comprising identifying the evictions based in part on recall probes.

14. The method as recited in claim 9, further comprising monitoring a hit rate of the cache memory.

15. The method as recited in claim 9, further comprising creating partitions of the cache memory based in part on a classification of cache traffic that comprises at least one of instructions lines, data lines, translation data, prefetch accesses, requests from particular requesters.

16. The method as recited in claim 9, wherein the cache memory is shared by two or more processor cores.

17. An apparatus comprising:
a cache comprising a first portion and a second portion different from the first portion;
a control unit comprising circuitry configured to:
responsive to a hit rate of the second portion of the cache meeting a threshold, at least some requests that miss on the first portion of the cache are allocated in the first portion of the cache; and
responsive to the hit rate not meeting the threshold, any request that misses on the first portion of the cache is not allocated in the first portion of the cache.

18. The apparatus as recited in claim 17, further comprising a probe filter, wherein the control unit is configured to partition the cache into at least the first portion and the second portion responsive to a message from the probe filter.

19. The apparatus as recited in claim 18, wherein the probe filter is configured to send the message responsive to detecting a number of recall probes is greater than a threshold.

20. The apparatus as recited in claim 17, wherein the control unit is configured to monitor the hit rate of the cache.

* * * * *